US011162507B2

(12) United States Patent
Miller

(10) Patent No.: US 11,162,507 B2
(45) Date of Patent: Nov. 2, 2021

(54) VARIABLE PITCH FAN PITCH LIMIT

(71) Applicant: DEERE & COMPANY, Moline, IL (US)

(72) Inventor: Shaun J. Miller, Woodward, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/251,385

(22) Filed: Jan. 18, 2019

(65) Prior Publication Data
US 2020/0232476 A1   Jul. 23, 2020

(51) Int. Cl.
F04D 29/36 (2006.01)
F04D 19/00 (2006.01)
F04D 29/32 (2006.01)
F04D 29/70 (2006.01)

(52) U.S. Cl.
CPC ......... *F04D 29/368* (2013.01); *F04D 19/005* (2013.01); *F04D 29/325* (2013.01); *F04D 29/703* (2013.01); *F05D 2240/30* (2013.01); *F05D 2260/74* (2013.01); *F05D 2270/303* (2013.01)

(58) Field of Classification Search
CPC ....... F04D 29/368; F04D 29/36; F04D 29/325
See application file for complete search history.

(56) References Cited

U.S. PATENT DOCUMENTS

| | | |
|---|---|---|
| 2,734,493 A | 2/1956 | Findley |
| 3,412,786 A | 11/1968 | Taylor |
| 4,076,072 A | 2/1978 | Bentz |
| 4,116,265 A | 9/1978 | Staebler |
| 5,186,240 A | 2/1993 | Kennon et al. |
| 6,253,716 B1 | 7/2001 | Palmer et al. |
| 6,442,942 B1 * | 9/2002 | Kopko ............ F02C 3/36 60/726 |
| 6,729,844 B2 | 5/2004 | Bettencourt |
| 6,792,769 B2 | 9/2004 | Trulaske, Sr. |
| 7,229,250 B2 | 6/2007 | McCallum et al. |
| 8,020,655 B2 | 9/2011 | Robinson |
| 9,622,408 B1 * | 4/2017 | Miller ............ A01D 61/00 |
| 9,765,684 B2 | 9/2017 | Schroeder |
| 2004/0033136 A1 | 2/2004 | Bettencourt |
| 2006/0254619 A1 | 11/2006 | Bigott |
| 2007/0095522 A1 | 5/2007 | Chang |
| 2008/0283220 A1 | 11/2008 | Martin et al. |
| 2010/0071877 A1 | 3/2010 | Goel |
| 2012/0247729 A1 | 10/2012 | Schertz et al. |
| 2014/0284027 A1 | 9/2014 | Pozzie et al. |
| 2017/0112054 A1 | 4/2017 | Miller et al. |

OTHER PUBLICATIONS

German Search Report issued in counterpart application No. 102019219296.3 dated Oct. 13, 2020 (10 pages).

* cited by examiner

Primary Examiner — Michael L Sehn
(74) Attorney, Agent, or Firm — Taft Stettinius & Hollister LLP; Stephen F. Rost

(57) ABSTRACT

A fan assembly that has a fan hub having a plurality of blades extending radially therefrom and having a variable pitch and a controller in communication with the fan assembly to reposition a pitch of the plurality of blades. The controller establishes a variable maximum pitch of the plurality of blades based on an ambient temperature.

19 Claims, 5 Drawing Sheets

VARIABLE PITCH FAN PITCH LIMIT

FIELD OF THE DISCLOSURE

The present disclosure relates to controlling the pitch of a variable pitch fan and more specifically to establishing a maximum pitch based on ambient conditions.

BACKGROUND

Many cotton harvesters or other work machines have a cooling system that incorporates a variable pitch fan to modulate airflow rate and direction. A reversing feature allows the fan to remove accumulated debris from a fixed screen or other intake surface that is degrading the cooling system performance by restricting airflow. Many work machines monitor at least one system of the work machine and modify the pitch of the fan blades between a reverse orientation and a maximum pitch. The fan will often function at the maximum pitch for a period of time before the reversal function is implemented.

SUMMARY

One embodiment is a fan assembly that has a fan hub having a plurality of blades extending radially therefrom and having a variable pitch; and a controller in communication with the fan assembly to reposition a pitch of the plurality of blades. Wherein, the controller establishes a variable maximum pitch of the plurality of blades based on an ambient temperature.

In one example of this embodiment, the variable maximum pitch is determined by the controller with a lookup table. In another example, the controller establishes a first maximum pitch for a first ambient temperature and a second maximum pitch for a second ambient temperature, wherein when the first ambient temperature is cooler than the second ambient temperature, the first maximum pitch is less than the second maximum pitch. In another example, the controller reverses an air flow direction of the fan after the plurality of blades are oriented in the variable maximum pitch. In yet another example, the pitch of the plurality of blades is repositionable between a minimum pitch and the variable maximum pitch by the controller.

In another example, the controller identifies a desired pitch of the plurality of blades, the desired pitch being no greater than the maximum pitch. In one aspect of this example, the desired pitch is determined based on a temperature or pressure of a vehicle system.

Another embodiment is a method for controlling the pitch of a variable pitch fan assembly that includes providing a fan hub, a plurality of blades extending radially from the fan hub, and a controller, identifying, with the controller, a maximum pitch of the plurality of blades based on an ambient factor, adjusting a pitch angle of the plurality of blades, with the controller, to a desired pitch that is at or between a minimum pitch and the maximum pitch.

In one example of this embodiment, the ambient factor is an ambient temperature. In another example, the desired pitch is identified by the controller by monitoring at least one vehicle system. In one aspect of this example, the at least one vehicle system monitored by the controller includes any one or more of an engine coolant temperature, a hydraulic oil temperature, an air intake temperature, or a refrigerant pressure.

In another example of this embodiment the desired pitch is identified by the controller by monitoring an engine coolant temperature, a hydraulic oil temperature, an air intake temperature, and a refrigerant pressure. In one aspect of this example, the controller selects any one of the engine coolant temperature, the hydraulic oil temperature, the air intake temperature, or the refrigerant pressure to establish the desired pitch.

In yet another example, the ambient factor is an ambient temperature and the controller identifies the ambient temperature and compares the ambient temperature to a reference to identify the maximum pitch. In one aspect of this example, the reference is a lookup table.

Yet another embodiment of this disclosure is a work machine that has an engine, a vehicle system; a fan assembly having blades that have a pitch angle that is repositionable, and a controller in communication with the fan assembly and the vehicle system to reposition the pitch angle of the blades. Wherein, the controller establishes a variable maximum pitch of the plurality of blades based on an ambient factor.

In one example of this embodiment, the ambient factor is an ambient temperature and the controller identifies the ambient temperature and compares the ambient temperature to a reference to identify the variable maximum pitch. In one aspect of this example, the reference is a lookup table.

In yet another example of this embodiment, the vehicle system includes any one or more of an engine coolant system, a hydraulic oil system, an air intake system, or a refrigerant system and the controller communicates with the vehicle system to identify a desired pitch of the plurality of blades. In one aspect of this example, the desired pitch is not greater than the variable maximum pitch.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
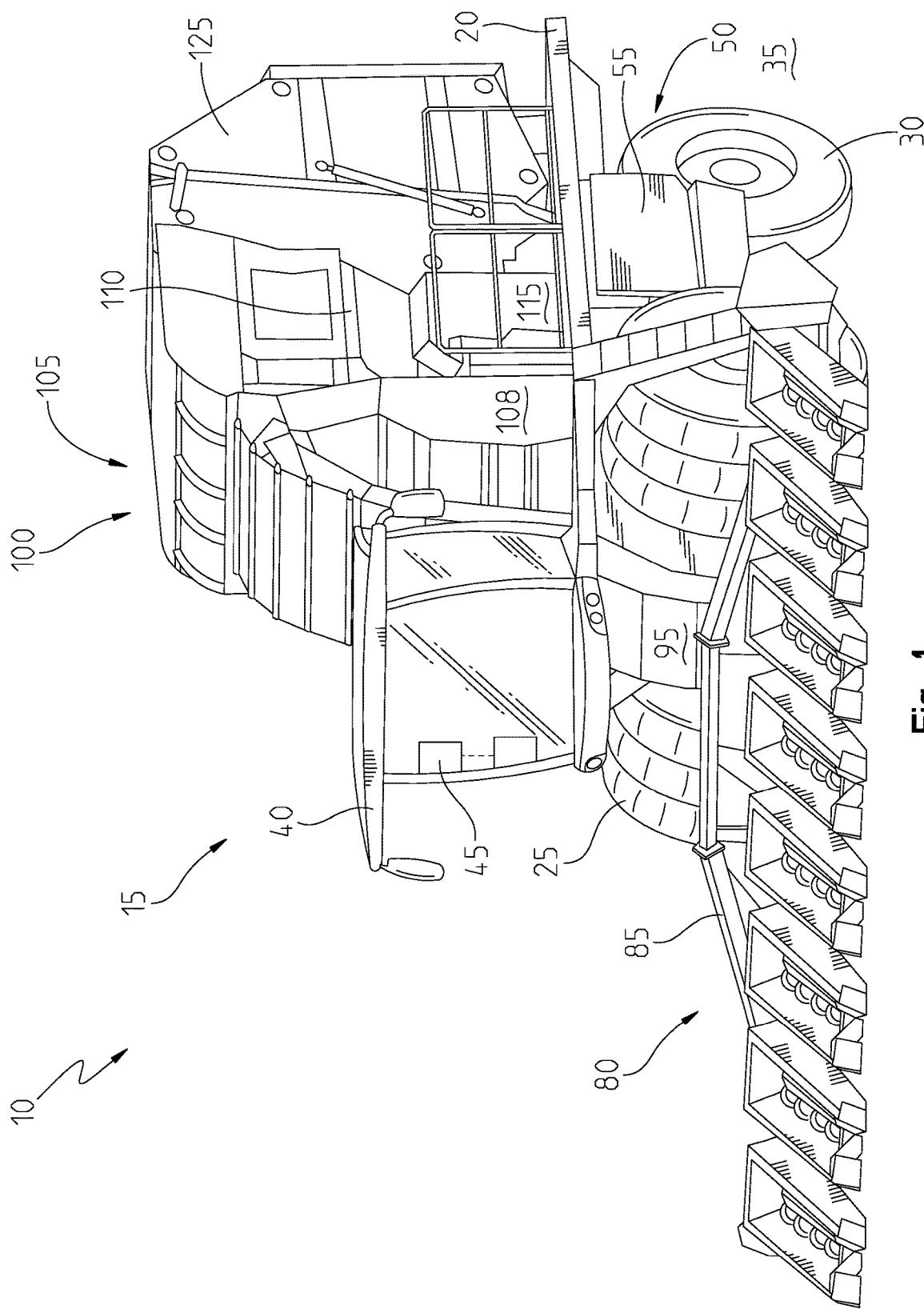
FIG. 1 is a perspective view of a harvester according to one embodiment.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 2:
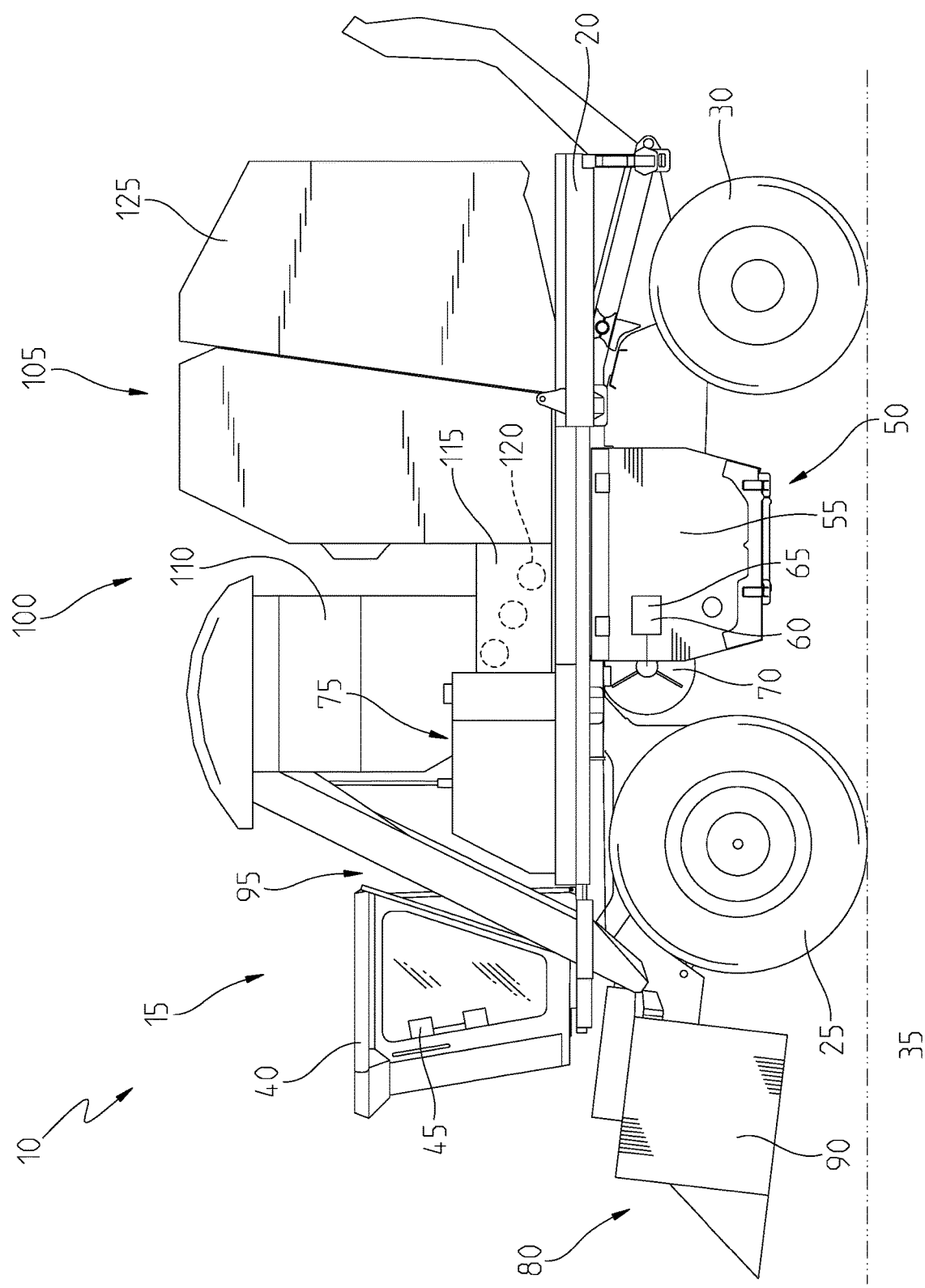
FIG. 2 is a side view of a harvester according to another embodiment.

FIGS. 1 and 2 illustrate a harvester 10. The illustrated harvester 10 is a cotton harvester 15 (e.g., cotton picker, cotton stripper). However, other types of harvesters 10 and work machines generally are contemplated by this disclosure (e.g., combines, tractors, motor vehicles).

The harvester 10 includes a chassis 20. The illustrated chassis 20 is supported by front wheels 25 and rear wheels 30 although other support is contemplated (e.g., tracks). The harvester 10 is adapted for movement through a field 35 to harvest crops (e.g., cotton, corn, stover, hay, and alfalfa among others). An operator station 40 is supported by the chassis 20. An operator interface 45 is positioned in the operator station 40.

Referring to FIG. 2, a power module 50 may be supported below the chassis 20. The power module may be an engine 55 that drives a hydraulic motor 60 or a mechanical drive 65 to power a variable pitch fan 70. An operator may set a minimum power for the power module 50 from the operator interface 45. The operator may also set a minimum engine speed from the operator interface 45. Water, lubricant, and fuel tanks, indicated generally at 75, may be supported on the chassis 20.

A harvesting structure 80 is coupleable to the chassis 20. The illustrated harvesting structure 80 is configured to remove cotton from the field 35. The harvesting structure 80 may be a cotton stripper header 85 (FIG. 1), one or more cotton picking units 90 (FIG. 2), or another harvesting structure 80 (e.g., corn head). Alternatively, the harvesting structure 80 may be configured to remove corn, or other crop.

With reference to FIGS. 1 and 2, an air duct system 95 is coupleable to the harvesting structure 80. A crop receptacle 100 is coupleable to the air duct system 95. Referring to FIG. 1, the illustrated crop receptacle 100 is a round module builder 105. Alternatively, the crop receptacle 100 may be a basket (not shown). The illustrated round module builder 105 includes a cleaner 108 that cleans the cotton harvested from the cotton stripper header 85 by removing trash and debris. With reference to FIG. 2, the round module builder 105 includes an accumulator 110 that is configured to receive cotton, or other crop, harvested by the cotton picking units 90.

With continued reference to FIG. 2, a feeder 115 is coupleable to the chassis 20. The feeder 115 is configured to receive cotton, or other crop, from the accumulator 110. The feeder 115 includes a plurality of rollers 120 configured to compress the cotton, or other crop, and transfer the cotton, or other crop, to a baler 125 of the round module builder 105.

Figure 3:
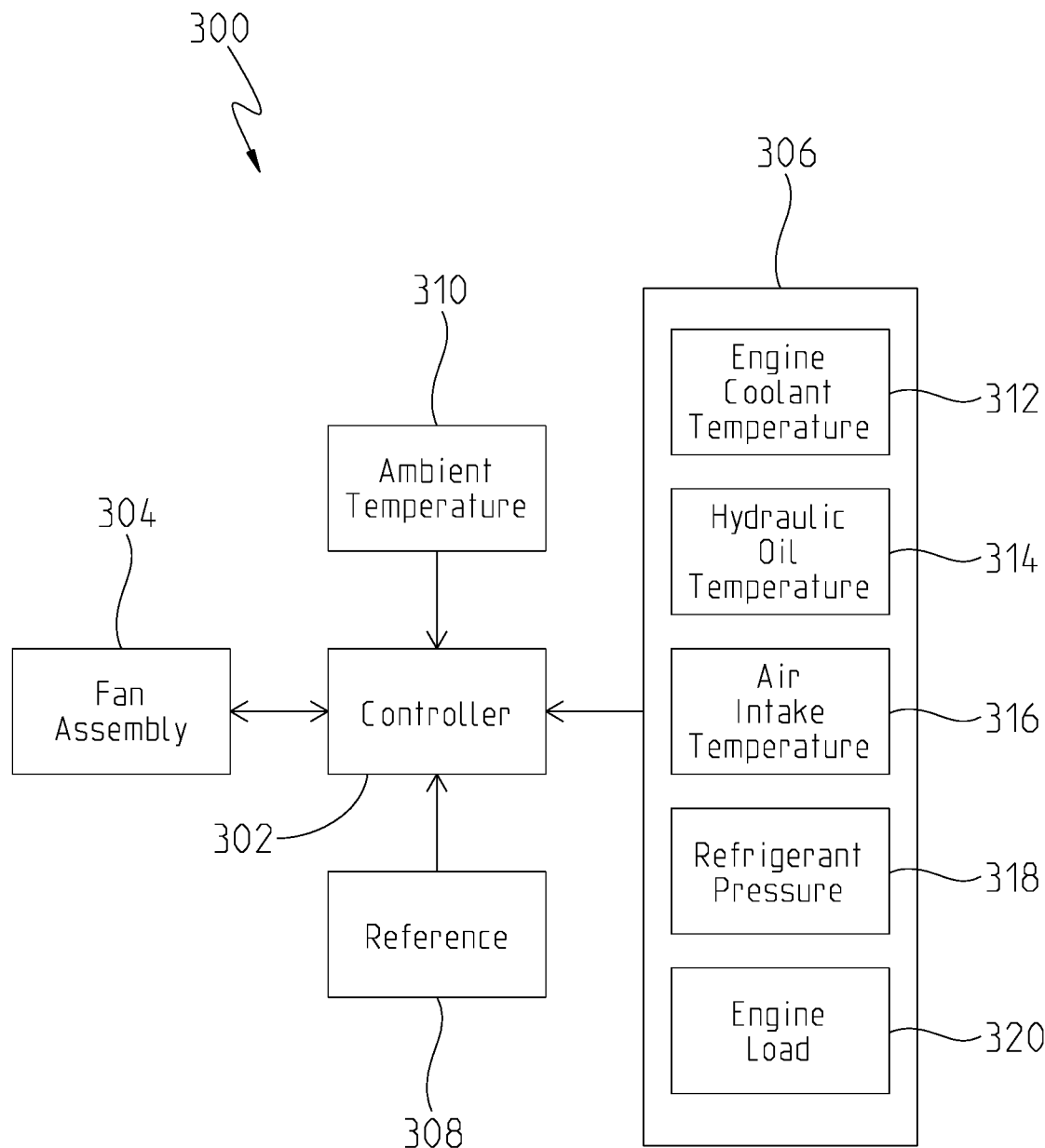
FIG. 3 is a schematic of a control system of a harvester according to another embodiment.
Figure 4:
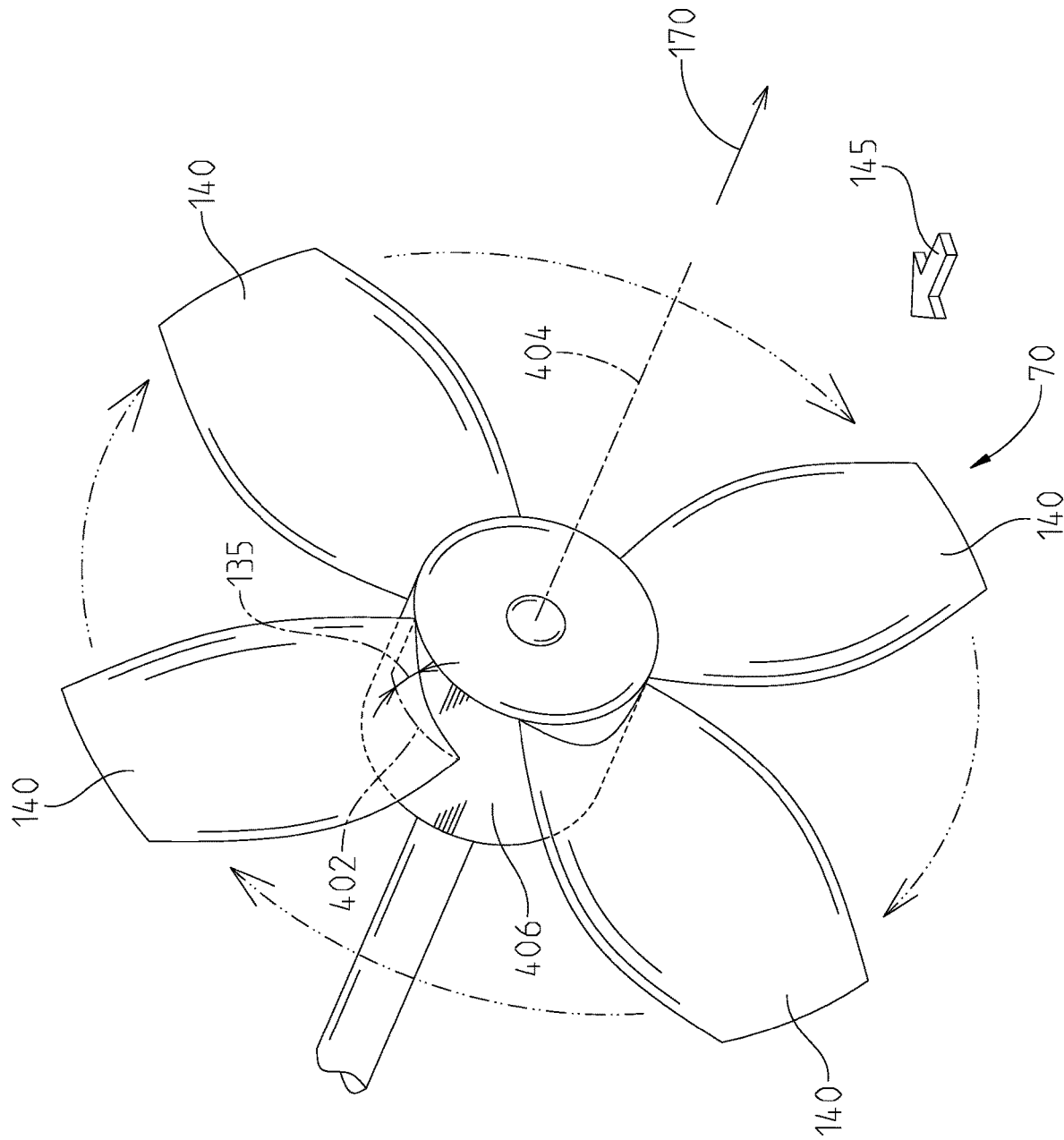
FIG. 4 is a partial view of a variable pitch fan according to one embodiment.
Figure 5:
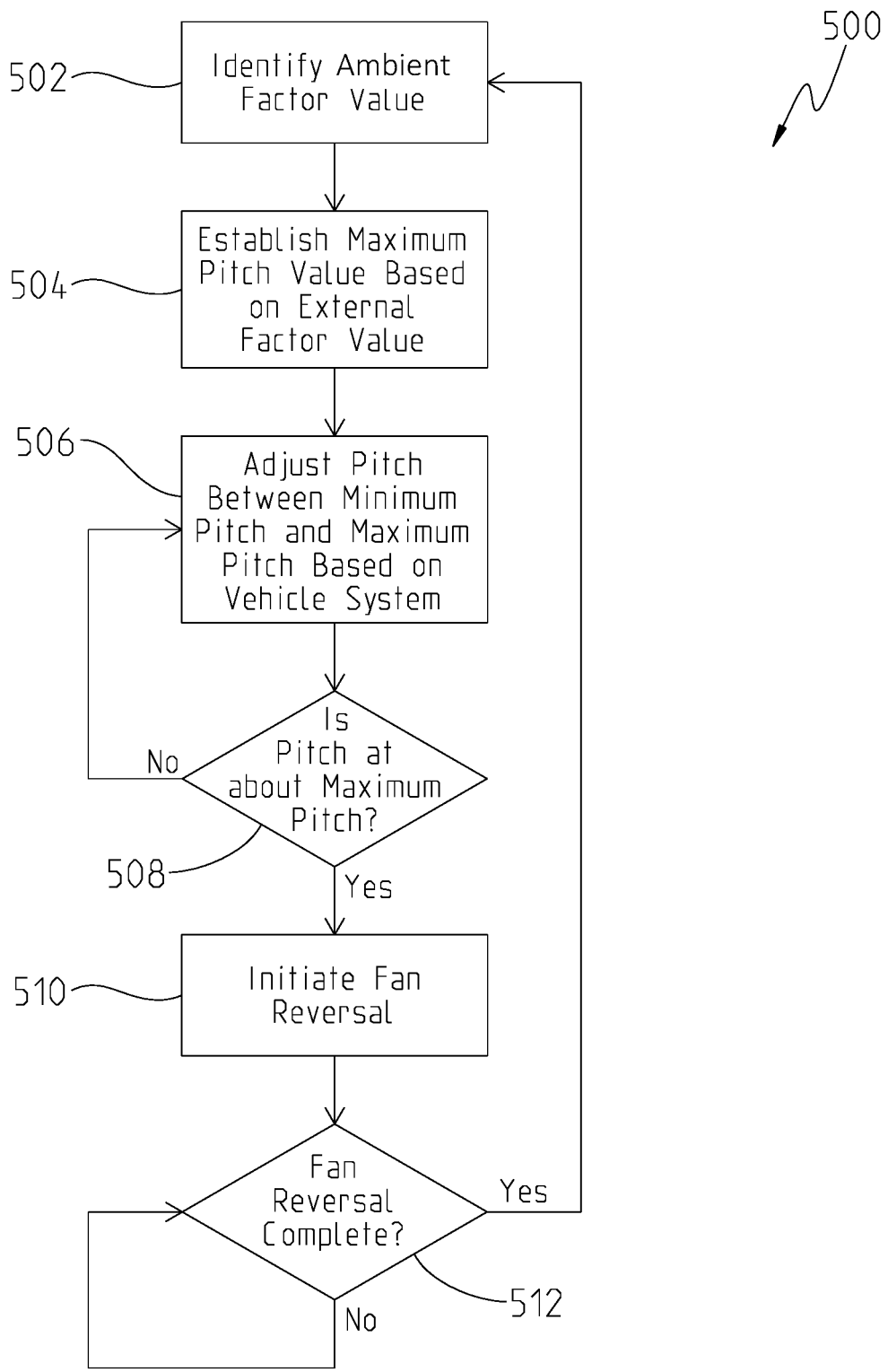
FIG. 5 is a schematic of an illustrative logic flow chart for a variable pitch fan.

Referring to FIGS. 3-5, the harvester 10 has a control system 300 for controlling a pitch 135 of a plurality of fan blades 140 of the variable pitch fan 70. The fan blades 140 may be pivotally coupled to a fan hub 406 to selectively vary the pitch 135 of the blades 140 responsive to signals from the control system 300. Further, the variable pitch fan 70 may be driven by the engine 55 of the harvester 10 or have an independent drive system. The variable pitch fan 70 is configured to selectively create an airflow in a first direction 145 or a second direction 170 responsive to the control system 300.

The pitch 135 may be defined relative to a transverse axis 402 that is transverse to a rotation axis 404. The pitch may be the angular offset of the fan blade 140 relative to the transverse axis 402. As discussed herein, a lesser or decreased pitch refers to an angular orientation of the fan blade 140 relative to the transverse axis 402 that is closer to zero degrees while a greater or increased pitch refers to an angular orientation of the fan blade 140 relative to the transverse axis 402 that is closer to ninety degrees.

In FIG. 3, a non-exclusive example of one embodiment of the control system 300 is illustrated. The control system 300 may have a controller 302 that communicates and controls one or more system of the harvester 10. The controller 302 may have a memory unit capable of storing data and one or more processors capable of executing commands, processes, and the like. Further, while the controller 302 is illustrated as a single component in FIG. 3, portions of the controller 302 may be located remotely from one another. In one non-exclusive example, the memory unit is stored remotely from the processor. The controller 302 may also be a controller that is part of another vehicle system. In one non-exclusive example, the controller 302 may be part of an engine control module, a body control module, or any other control module or the like of the harvester 10.

The controller 302 may communicate with a fan assembly 304 to selectively alter the pitch 135 and airflow direction 145, 170 of the fan 70. More specifically, the controller 302 may set the pitch 135 and airflow direction 145, 170 of the fan 70 based on values communicated by vehicle systems 306, a reference 308, and an ambient temperature 310 among other things. The vehicle systems 306 may communicate to the controller 302 values indicating an engine coolant temperature 312, a hydraulic oil temperature 314, a charge air or air intake temperature 316, a refrigerant pressure 318, and an engine load 320 to give a few non-exclusive examples. The controller 302 may monitor any one or more of the values of the vehicle systems 306 to determine the appropriate pitch 135 and air flow direction 145, 170 of the fan 70.

The controller 302 may utilize the reference 308 or the like to determine the appropriate pitch 135 and direction 145, 170 for the fan 70. The reference 308 may be a lookup table, algorithm, chart, graph, program, or any other storable utility capable of determining an output based on variables. The controller 302 may utilize the reference 308 to compare one or more values of the vehicle systems 306 with the ambient temperature 310, among other things, to establish a maximum pitch in the first direction 145 as described herein.

The ambient temperature 310 may be determined based on a temperature sensor located anywhere on the harvester 10. The ambient temperatures 310 may be the temperature of the surrounding air that the fan 70 is moving in either the first or second directions 145, 170. In one non-exclusive example of this disclosure, the ambient temperature 310 is monitored by the controller 302 to identify a maximum allowable pitch of the fan 70. The maximum allowable pitch 135 may be variable depending on the ambient temperature 310 in order to efficiently cool the engine 55 and other vehicle systems 306 of the harvester 10.

While a sensor of the harvester 10 is discussed as identifying the ambient temperature 310, the controller 302 may utilize any known resource to identify the ambient temperature 310. More specifically, in one non-exclusive example the controller 302 may have access to a wireless data transfer network. The controller 302 may utilize the wireless data transfer network to identify the ambient temperature 310 instead of using a sensor. Accordingly, the controller 302 may identify the ambient temperature 310 utilizing a sensor or other wired or wireless resources capable of identifying the temperature of a specific geographic region.

In one non-exclusive example, when the controller 302 detects low ambient temperatures 310, the maximum allowable pitch 135 may be less than when the controller 302 detects comparably higher ambient temperatures 310. In one non-exclusive example, the reference 308 may include a lookup table or the like that correlates the ambient temperature 310 with the maximum allowable pitch 135. In this configuration, as the ambient temperature 310 becomes higher, the maximum allowable pitch 135 may also increase. In one non-exclusive example, the reference 308 may establish the maximum allowable pitch 135 when the fan 70 is providing airflow in the first direction 145 to cool the engine 55 or other vehicle system 306.

In one example of this disclosure, as the pitch 135 of the fan blades 140 is increased, the resistance of the fan 70 is also increased. In this configuration, a greater pitch 135 results in greater fan resistance. Accordingly, higher pitch values 135 require greater power consumption from the engine 55 or other system of the harvester 10 compared to lesser pitch values. In one non-exclusive example, the highest pitch 135 may be about ninety degrees relative to the corresponding transverse axis 402 and the lowest pitch 135 may be about zero degrees relative to the corresponding transverse axis 402. Similarly, the highest pitch 135 may generate the highest fan resistance and the lowest pitch 135 may generate the lowest fan resistance when all other variables remain substantially constant. Further, the fan resistance may correspondingly increase as the pitch 135 transitions from the lowest pitch 135 to the highest pitch 135.

In one aspect of this disclosure, the controller 302 may establish a maximum effective pitch 135 based at least on the ambient temperature 310. The maximum effective pitch 135 may be the pitch angle at which the fan 70 efficiently cools the engine 55 or other vehicle systems 306. More specifically, the maximum effective pitch 135 may be a pitch at which a greater pitch 135 is not necessary based on the ambient temperature 310 to cool the engine or other vehicle systems 306. In other words, the maximum effective pitch 135 may be the lowest pitch 135 that allows for maximizing cooling of the engine 55 and other vehicle systems 306 while minimizing the fan resistance of the fan 70 based on the ambient temperature 310. In one non-exclusive example, increasing the pitch 135 greater than the maximum effective pitch 135 increases the fan resistance while not substantially increasing the cooling of the engine 55 or other vehicle system 306 with the fan 70 under the ambient temperature 310.

In one aspect of this disclosure, after the controller 302 identifies the maximum effective pitch 135, the controller 302 generates an initial pitch setting signal to set the pitch 135 of the plurality of fan blades 140 to a position at or between the maximum effective pitch 135 and the minimum pitch 135. The controller 302 compares the values of one or more of the vehicle systems 306 to vehicle system limits and generates a fan reversal signal if one or more of the vehicle system values are equal to or greater than the vehicle system limits and the fan 70 is operating at the maximum effective pitch 135 for the ambient temperature 310. The fan reversal signal is configured to temporarily cause the pitch 135 of the plurality of fan blades 140 to change in order to cause the airflow to flow in the second direction 170, opposite the first direction 145, before causing the airflow to revert back to flowing in the first direction 145. The fan reversal signal may cause the pitch 135 to change to a maximum reversed pitch. In one aspect of this disclosure, the operator interface 45 may be used to set a reversal timeframe that is received by the controller 302 and sets the amount of time that the pitch 135 is changed due to the maximum reversed pitch. In another aspect of this disclosure, the controller 302 may run the fan 70 at the maximum reversed pitch for a preset amount of time.

Referring now to FIG. 5, one non-exclusive example of a logic flow chart 500 of the present disclosure is illustrated. The logic flow chart 500 may be implemented by the controller 302 to minimize fan resistance to the harvester 10 based on ambient temperature without substantially affecting the fan's 70 cooling. The logic flow chart 500 may be stored in the controller 302 or in any other component capable of sending commands to control the fan 70 and identify values of the vehicle systems 306 and the ambient temperature 310. Accordingly, while one aspect of this disclosure contemplates executing the logic flow chart 500 with the controller 302, some or all of the logic flow chart 500 may be executed by additional components, some of which may be located remotely from the harvester 10.

The logic flow chart 500 may first identify an ambient factor value in box 502. The ambient factor value may be the ambient temperature 310. However, any other relevant ambient factor may also be considered. More specifically, relative humidity, elevation, and the like may be considered in box 502 as well. After the ambient factor value is identified in box 502, the controller 302 or the like may establish a maximum pitch value based on the ambient factor value in box 504. The maximum pitch value may be determined by the controller 302 by applying the ambient factor value to the reference 308. More specifically, the reference 308 may contain a lookup table or the like wherein all potential ambient factor values correspond with a maximum pitch value. In this configuration, the maximum pitch can be altered depending on the ambient factor value.

In one non-exclusive embodiment of this disclosure, the ambient factor value identified in box 502 may be the ambient temperature 310. In this embodiment, the maximum pitch value of box 504 may be established by utilizing an ambient temperature lookup table as the reference 308. The ambient temperature lookup table may be a list of expected ambient temperatures or temperature ranges each correlating with a specific maximum pitch value. More specifically, Table A-1 illustrates one non-exclusive example of a lookup table.

TABLE A-1

| Ambient Temperature | Maximum Pitch Value |
|---|---|
| AmbTemp1 | MaxPitch1 |
| AmbTemp2 | MaxPitch2 |
| AmbTemp3 | MaxPitch3 |
| AmbTemp4 | MaxPitch4 |

Table A-1 illustrates a plurality of ambient temperature variables (AmbTemp1 to AmbTemp4) in the "Ambient Temperature" column. Further, each ambient temperature variable has a maximum pitch value (MaxPitch1 to MaxPitch4) in a corresponding row on in a "Maximum Pitch Value" column. In this example, the ambient temperature variable may be the actual ambient temperature surrounding the harvester 10.

The maximum pitch value may be the maximum effective pitch of the fan 70 in the corresponding ambient temperature. In one non-exclusive example, AmbTemp1 may be at about forty-five degrees Fahrenheit and AmbTemp4 may be at about eighty-five degrees Fahrenheit. In this configuration, MaxPitch1 may be less than MaxPitch4 because the corresponding AmbTemp1 is less than the corresponding AmbTemp4. That is to say, because the ambient temperature of AmbTemp1 provides additional cooling of the engine 55 or other vehicle systems 306 relative to the temperature of AmbTemp4, the maximum pitch of the fan 70 under AmbTemp1 can be less than that of AmbTemp4 while still effectively cooling the engine 55 and vehicle systems 306.

In one example of this disclosure, each ambient temperature variable may be an ambient temperature range. In this configuration, the controller 302 determines which ambient temperature variable range the actual ambient temperature is in. Then, the controller 302 utilizes the reference 308 to identify the appropriate maximum pitch value for the identified ambient temperature variable in the reference 308.

Referring now to box 506, the controller may adjust the pitch 135 of the fan 70 to a desired pitch which may be any pitch 135 between or equal to the minimum pitch and the maximum pitch identified in box 504. In box 506, the controller 302 may monitor the vehicle systems 306 to determine whether the engine 55 or other vehicle systems 306 require additional cooling. If the controller 302 identifies that one or more of the vehicle systems 306 requires additional cooling, the controller 302 may increase the pitch 135 to the desired pitch to increase the cooling applied by the fan 70. The desired pitch may be increased until the desired pitch is equal to about the maximum pitch of box 504. In box 508, the controller 302 may compare the desired or actual pitch 135 of the fan 70 to the maximum pitch value identified in box 504. If the desired or actual pitch 135 is not equal to or greater than about the maximum pitch of box 504, the controller 302 may continue to adjust the pitch responsive to values of the vehicle systems 306 as described in box 506.

However, if the actual pitch 135 of the fan 70 is at about the maximum pitch of box 504, the controller 302 may maintain the fan 70 at the maximum pitch of box 504 for a preset time period. Alternatively, the controller 302 may maintain the fan 70 at the maximum pitch of box 504 for a time period established by the operator interface 45. If the fan 70 is maintained at the maximum pitch of box 504 for the preset or operator selected time period and the values of the vehicle systems 306 are not reduced, the controller 302 may initiate a fan reversal in box 510.

The fan reversal may be where the controller 302 adjusts the pitch 135 of the fan 70 to provide air flow in the second direction 170. By providing air flow in the second direction 170, the fan 70 may dislodge or otherwise clear debris that may be restricting air flow to the fan in the first direction 145. Further, in box 512 the controller 302 may maintain the pitch 135 in the reversed pitch orientation for a preset or operator selected period of time. In other words, the fan 70 may provide airflow in the second direction 170 for an amount of time preset in the controller 302 or the like or for an amount of time input by an operator with the operator interface 45. Once the preset or operator defined time period of box 512 is over, the controller may return to box 502 and repeat the logic flow chart 500.

In one aspect of this disclosure, the pitch 135 of the fan 70 will be substantially maintained at the smallest pitch required for performance for the maximum amount of time. By maintaining the pitch 135 of the fan 70 as discussed herein, the overall average power consumption from the fan 70 is reduced without substantially reducing the cooling of the fan. In other words, as fan performance is degraded with the accumulation of debris, the fan 70 will increase the pitch 135 to produce more airflow. In order to keep the fan 70 from pitching too high in a given ambient condition, the controller 302 can look at the ambient temperature 310, and determine the maximum pitch value for that ambient temperature via the reference 308 or look up table. This will ensure that in cooler ambient temperatures the fan 70 does not reach higher pitch ranges that are not necessary.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A fan assembly, comprising:
a fan hub having a plurality of blades extending radially therefrom and having a variable pitch;
a controller in communication with the fan assembly to reposition a pitch of the plurality of blades; and
at least one vehicle system monitored by the controller;
wherein, the controller establishes a variable maximum pitch of the plurality of blades based on an ambient temperature, the variable maximum pitch being the greatest angle of the pitch allowed by the controller based on the ambient temperature;
wherein, the controller identifies a desired pitch that is any pitch at or between a minimum pitch and the variable maximum pitch based on the at least one vehicle system, the desired pitch being the pitch that provides the least resistance to the fan assembly while lowering or maintaining a temperature or pressure of the at least one vehicle system.

2. The fan assembly of claim 1, wherein the variable maximum pitch is determined by the controller with a lookup table.

3. The fan assembly of claim 1, further wherein the controller establishes the variable maximum pitch based on the ambient temperature by referencing a lookup table comprising a first maximum pitch for a first ambient temperature and a second maximum pitch for a second ambient temperature, wherein when the first ambient temperature is cooler than the second ambient temperature, the first maximum pitch is less than the second maximum pitch.

4. The fan assembly of claim 1, further wherein the controller reverses an air flow direction of the fan assembly when the desired pitch is at about the variable maximum pitch, the plurality of blades are oriented in the variable maximum pitch for a preset time, and the at least one vehicle system is not within the system limit.

5. The fan assembly of claim 1, further wherein the pitch of the plurality of blades is repositionable by the controller to the desired pitch that is between a minimum pitch and the variable maximum pitch, the desired pitch being established by the controller by monitoring the at least one vehicle system.

6. The fan assembly of claim 1, further wherein the desired pitch is determined based on a temperature or pressure of at least one vehicle system.

7. The fan assembly of claim 1, further wherein the desired pitch of the plurality of blades is configured to provide the least resistance to the fan assembly while cooling or maintaining a temperature of the at least one vehicle system.

8. A method for controlling the pitch of a variable pitch fan assembly, comprising:

providing a fan hub, a plurality of blades extending radially from the fan hub, and a controller in communication with the fan assembly to reposition a pitch of the plurality of blades;

identifying, with the controller, a variable maximum pitch of the plurality of blades based on an ambient temperature, the variable maximum pitch being the greatest angle of the pitch allowed by the controller based on the ambient temperature;

establishing, with the controller, a desired pitch by monitoring at least one vehicle system, the desired pitch being any pitch of the plurality of blades at or between the maximum pitch and a minimum pitch; and adjusting a pitch angle of the plurality of blades, with the controller, to the desired pitch;

wherein, the desired pitch is the pitch that provides the least resistance to the fan assembly while lowering or maintaining a temperature or pressure of the at least one vehicle system.

9. The method of controlling the variable pitch fan assembly of claim 8, further wherein the desired pitch is identified by the controller by monitoring a pressure or temperature of the at least one vehicle system.

10. The method of controlling the variable pitch fan assembly of claim 9, further wherein the at least one vehicle system monitored by the controller includes any one or more of an engine coolant temperature, a hydraulic oil temperature, an air intake temperature, or a refrigerant pressure.

11. The method of controlling the variable pitch fan assembly of claim 8, further wherein the at least one vehicle system monitored by the controller to establish the desired pitch is an engine coolant temperature, a hydraulic oil temperature, an air intake temperature, and a refrigerant pressure.

12. The method of controlling the variable pitch fan assembly of claim 11, further wherein the controller selects any one of the engine coolant temperature, the hydraulic oil temperature, the air intake temperature, or the refrigerant pressure to establish the desired pitch.

13. The method of controlling the variable pitch fan assembly of claim 8, further wherein the controller identifies the ambient temperature and compares the ambient temperature to a reference to identify the maximum pitch.

14. The method of controlling the variable pitch fan assembly of claim 13, further wherein the reference is a lookup table.

15. A work machine, comprising:
an engine;
a vehicle system;
a fan assembly having a fan hub with blades that have a pitch angle that is repositionable; and
a controller in communication with the fan assembly and the vehicle system to reposition the pitch angle of the blades;
wherein, the controller establishes a variable maximum pitch of the plurality of blades based on an ambient temperature, the variable maximum pitch being the greatest angle of the pitch allowed by the controller based on the ambient temperature;
wherein, the controller establishes a desired pitch that is any pitch at or between a minimum pitch and the variable maximum pitch based on the at least one vehicle system and orients the pitch angle of the blades to the desired pitch, the desired pitch being the pitch that provides the least resistance to the fan assembly while lowering or maintaining a temperature or pressure of the vehicle system.

16. The vehicle system of claim 15, further wherein the controller identifies the ambient temperature and compares the ambient temperature to a reference to identify the variable maximum pitch.

17. The vehicle system of claim 16, further wherein the reference is a lookup table.

18. The vehicle system of claim 15, further wherein the vehicle system includes any one or more of an engine coolant system, a hydraulic oil system, an air intake system, or a refrigerant system and the controller communicates with the vehicle system to identify the desired pitch of the plurality of blades.

19. The vehicle system of claim 18, further wherein when the desired pitch is at or about the variable maximum pitch for a preset time, the controller reverses an air flow direction of the fan assembly.

* * * * *